United States Patent
Zhou et al.

(10) Patent No.: US 8,103,675 B2
(45) Date of Patent: Jan. 24, 2012

(54) PREDICTING USER-ITEM RATINGS

(75) Inventors: Yunhong Zhou, Cupertino, CA (US);
Robert S. Schreiber, Palo Alto, CA (US); Dennis M. Wilkinson, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 12/254,303

(22) Filed: Oct. 20, 2008

(65) Prior Publication Data
US 2010/0100516 A1    Apr. 22, 2010

(51) Int. Cl.
*G06F 17/16* (2006.01)
(52) U.S. Cl. ............. 707/741; 706/12; 706/46; 708/520
(58) Field of Classification Search .................. 707/743, 707/741; 708/520
See application file for complete search history.

(56) References Cited

U.S. PATENT DOCUMENTS

| | | | |
|---|---|---|---|
| 6,487,541 B1 * | 11/2002 | Aggarwal et al. | 705/7.29 |
| 6,687,696 B2 * | 2/2004 | Hofmann et al. | 1/1 |
| 6,839,680 B1 | 1/2005 | Liu et al. | |
| 7,075,000 B2 * | 7/2006 | Gang et al. | 84/600 |
| 7,328,216 B2 * | 2/2008 | Hofmann et al. | 1/1 |
| 7,870,083 B2 * | 1/2011 | Zhu et al. | 706/12 |
| 2003/0101449 A1 | 5/2003 | Bentolila et al. | |
| 2006/0041548 A1 * | 2/2006 | Parsons et al. | 707/5 |
| 2008/0126176 A1 | 5/2008 | Iguchi | |

OTHER PUBLICATIONS

Zhou et al., Algorithmic Aspects in Information and Management, Jul. 2008, Springer-Verlag New York, pp. 337-348.*

Zhou, Yunhong et al.; "Large-scale Parallel Collaborative Filtering for the Netflix Prize"; Jun. 17, 2008; 337-348; vol. 5034/2008; Springer Berlin/Heidelberg.

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: The Collective Intelligence Platform, Online, http://www.baynote.com/technology/platform/ 2010.

Hottolink Inc.; "Recognize" Online, http://www.hottolink.co.jp/english/reconize.html, 2009.

Andrejko et al.: User Characteristics Acquisition from Logs with Semantics 8. Slovak University of Technology in Bratislava.

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

(Continued)

*Primary Examiner* — Shahid Alam
*Assistant Examiner* — Albert Phillips, III (57) ABSTRACT

A method of predicting user-item ratings includes providing a first matrix of hidden variables associated with individual items, a second matrix of hidden variables associated with individual users, a third matrix of predicted user-item ratings derived from an inner product of vectors in the first and second matrices, and a fourth matrix of actual user-item ratings. The first and second matrices are alternately fixed and solved with a weighted-$\lambda$ regularization of at least one of the first and second matrices by minimizing a sum of squared errors between actual user-item ratings in the fourth matrix and corresponding predicted user-item ratings in the third matrix repeatedly until a stopping criterion is satisfied.

20 Claims, 5 Drawing Sheets

OTHER PUBLICATIONS

Shahabi et al.; "Yoda an Accurate and Scalable Web based Recommendation System?" University of Southern California, Los Angeles, Sep., 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

PREDICTING USER-ITEM RATINGS

BACKGROUND

Recommendation systems are commonly used in many computing sectors, particularly those involving internet-based commerce. Many of these systems are designed to recommend items such as movies, music, websites, or other products or services to interested potential customers. Generally, these recommendations are based on information that is available about the individual and the items that might be recommended. In some systems, the recommendations may also be based on the collective taste and preferences of groups of existing or potential customers.

Algorithms used for recommendation systems have traditionally been classified into two types: content-based algorithms and collaborative filtering algorithms. Content-based recommendation algorithms generally analyze the content of items in which a user has shown interest and recommend other items to the user that have similar or comparable content. Collaborative filtering algorithms, on the other hand, typically make automatic predictions about the interests of a user by collecting information from many users and recommend items to individual users based on commonalities in the user's interests and the interests of other users.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, collaborative filtering can be used to provide recommendations of items to a user based on observed commonalities between the taste and interests of that particular user and the taste and interests of other users. Often these tastes and interests of users may be observed and recorded through a rating system in which individual users rate individual items. These ratings may then be made available in a database to the collaborative filtering algorithm.

However, in some systems, a very large data set of items available may prevent most users from rating all but a very small percentage of the items available. The relative scarcity of actual user-item ratings when compared to the large number of possible user-item ratings, may prevent meaningful recommendations of items to individual users.

To address these and other issues, the present specification discloses methods and systems for predicting user ratings of specific items. These methods and systems may be used to predict the rating that a particular user might give to a specific item. The predicted ratings may then be used as a basis for recommending items to specific users.

As used in the present specification and in the appended claims, the term "matrix" refers to the storage and organization of numerical data according to a multidimensional index. For example, a matrix of user-item ratings indexes numerical rating data according to the user providing the rating and the item being rated.

As used in the present specification and in the appended claims, the term "fix" and derivative terms, when referring to a matrix, mean freezing all matrix data at its present value without change.

As used in the present specification and in the appended claims, the term "solve" and derivative terms, when referring to a matrix, mean adjusting the value of data stored in the matrix to cause the matrix to conform to a given equation.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative methods and systems.

Illustrative Methods

Figure 1:
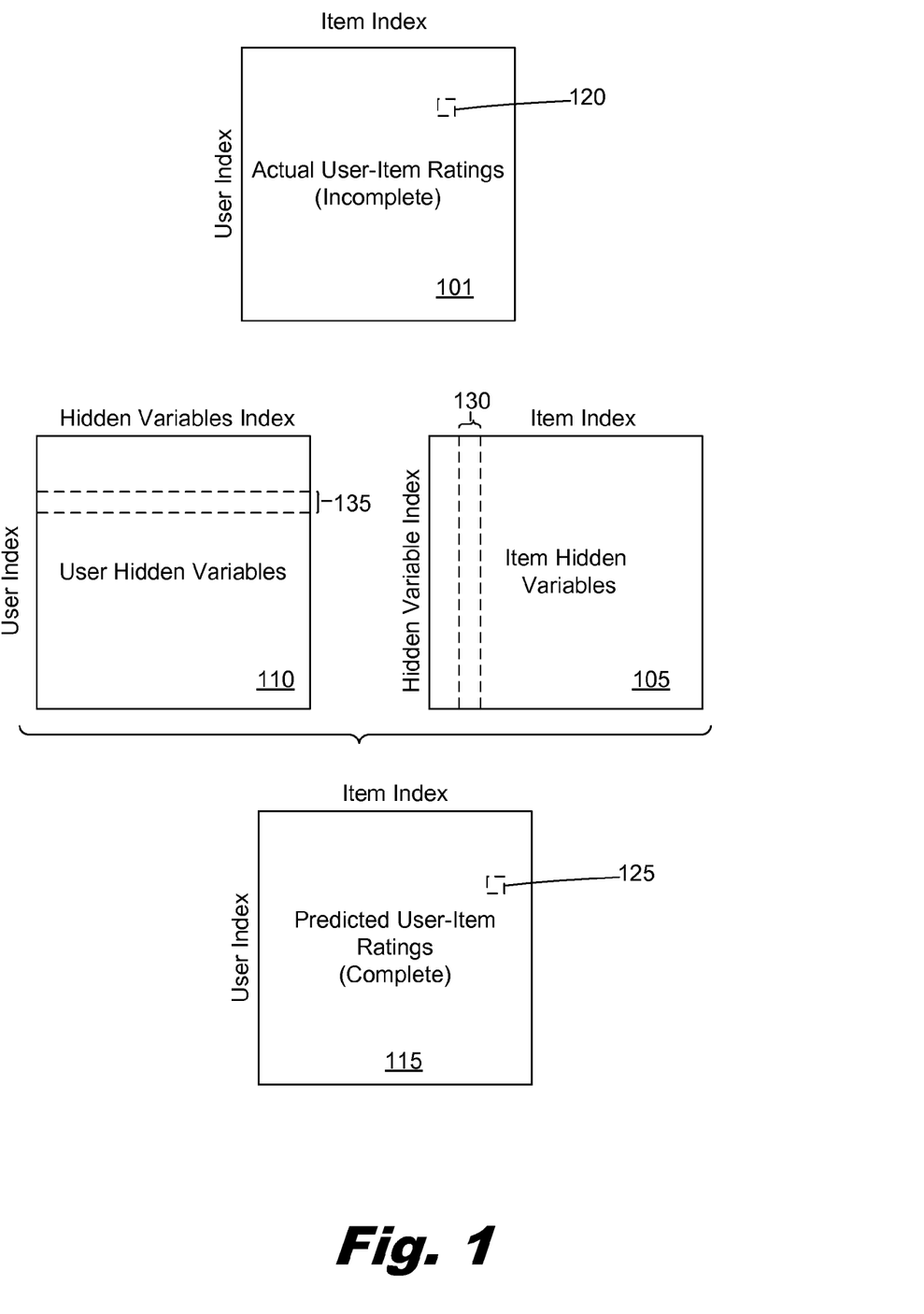
FIG. 1 is a block diagram of illustrative data matrices used to predict user-item ratings according to one embodiment of the principles described herein.

Referring now to FIG. 1, a block diagram is shown of illustrative data matrices (101, 105, 110, 115) used to predict user-item ratings according to one embodiment of the principles described herein. The data matrices (101, 105, 110, 115) may include an actual user-item ratings matrix (101), an item hidden variables matrix (105), a user hidden variables matrix (110), and a predicted user-item ratings matrix (115).

The items being rated by the users may be any type of item that may suit a particular application. For the purposes of illustration, the process of predicting user-item ratings will now be explained in the context of movies that are rated by individual users. However, it will be readily apparent to one of ordinary skill in the art that the methods and systems of the present application can be applied to any items that may suit a particular application.

Let $R=\{r_{ij}\}_{n_u \times n_m}$ denote the actual user-item ratings matrix (101), where each element $r_{ij}$ (120) represents the rating score of a movie j rated by user I, with the rating value either being a real number or missing. $n_u$ may designate the number of users, and $n_m$ may indicate the number of movies available in the dataset.

The present methods and systems may be configured to predict some of the missing values in the actual user-item ratings matrix R (101) based on the known values. These predicted values (125) may be stored in the predicted user-item ratings matrix (115).

To begin, a low-rank approximation of the actual user-item ratings matrix R (101) is obtained. This approach models both users and movies by giving them coordinates in a low-dimensional hidden variable space. Each user and each movie in the dataset has a hidden variable vector (130, 135, respectively), and each rating (known or unknown) of a movie by a user is modeled as the inner product of the corresponding user and movie hidden variable vectors. More specifically, let $M=[m_j]$ be the item hidden variable matrix (105) configured to store a plurality of movie hidden variable vectors (130), where $m_j \subset R^{nf}$ for all $j=1 \ldots n_m$, and $U=[u_i]$ be the user hidden variable matrix (110), where $u_i \subset R^{nf}$ for all $i=1 \ldots n_u$. Here $n_f$ is the dimension of the feature space, that is, the number of hidden variables in the model. $n_f$ may be a system parameter that can be determined experimentally.

If user ratings were fully predictable and $n_f$ were sufficiently large, it could be expected that $r_{ij}=\langle u_i, m_j \rangle$, $\forall$ i, j. In practice, however, a loss function can be minimized to obtain the matrices U and M. For example, the loss due to a single rating (r) according to the mean-square loss function is defined as the squared error:

$$L^2(r;u;m)=(r-\langle u;m \rangle)^2 \qquad (1)$$

Then the empirical, total loss (for a given pair U and M) may be defined as the summation of loss on all known ratings in Eq. (2):

$$\mathcal{L}^{emp}(R, U, M) = \frac{1}{n} \sum_{(i,j) \in I} \mathcal{L}^2(r_{ij}, u_i, m_j), \qquad (2)$$

where I is the index set of the known ratings and n is the size of I. Thus, the low-rank approximation problem can be formulated as follows:

$$(U, M) = \arg\min_{(U,M)} \mathcal{L}^{emp}(R, U, M). \qquad (3)$$

where U and M are real, have $n_f$ columns, but are otherwise unconstrained.

In this problem (Eq. (3)), there are $(n_u+n_m) \times n_f$ free parameters to be determined. As described above, in some cases the set I of known ratings (the set of pairs (i,j) for which user i's rating of movie j is known) may have far fewer than $n_u n_m$ elements, especially if $n_m$ is very large (e.g. several thousand movies). This is because it may be very difficult for all but a very few users to view and rate a large number of movies. Solving the problem of Eq. (3) with many parameters (when $n_f$ is relatively large) from a sparse dataset may overfit the data. To avoid overfitting, a Tikhonov regularization term may be appended to the empirical risk function (Eq. (4)).

$$L_\lambda^{reg}(R;U;M)=L^{emp}(R;U;M)+\lambda(\|U\Gamma_U\|^2+\|M\Gamma_M\|^2); \qquad (4)$$

for a certain number of suitably selected Tikhonov matrices $\Gamma_U$ and $\Gamma_M$. Details of possible implementations of the Tikhonov regularization will be described in more detail below.

Figure 2:
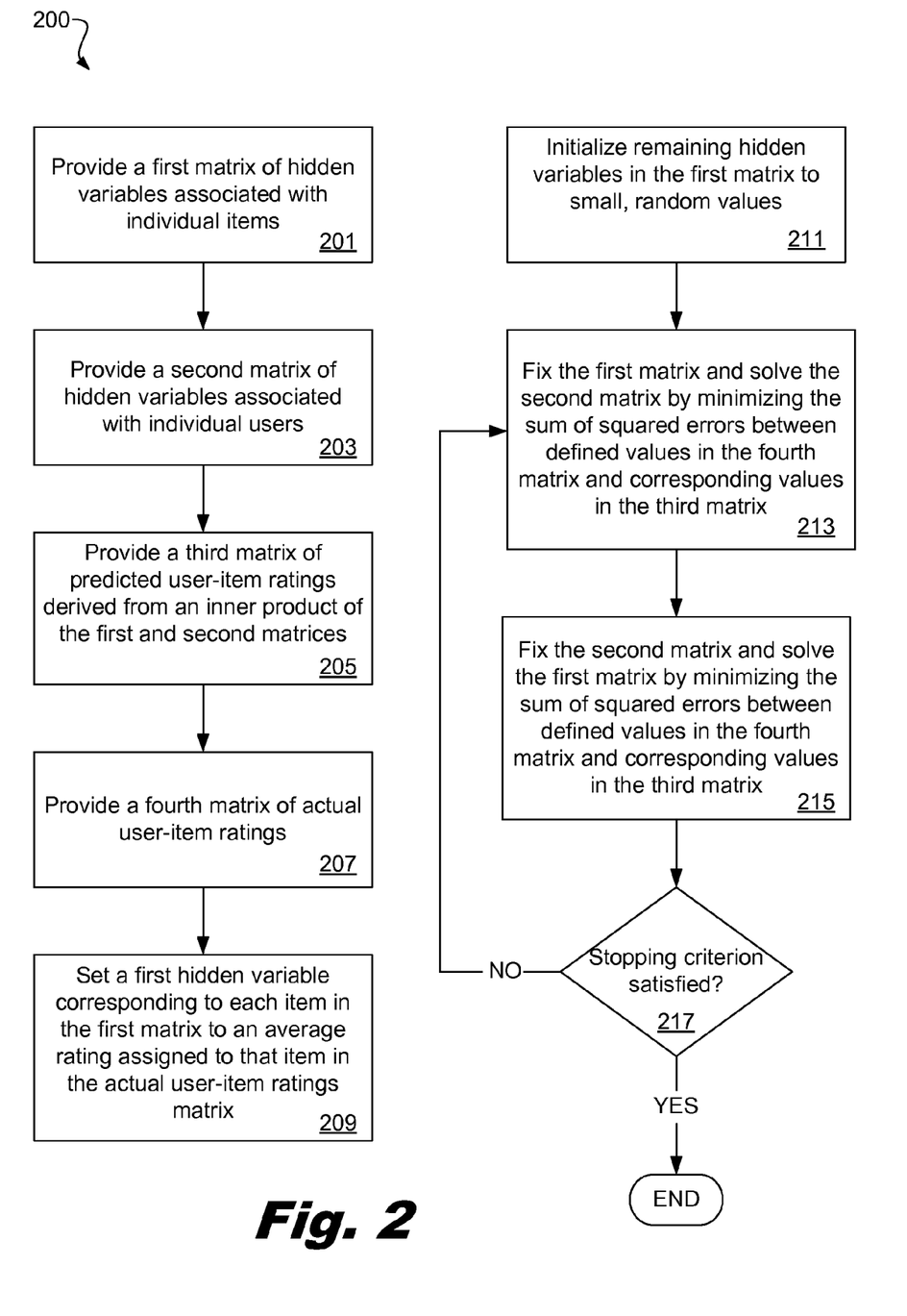
FIG. 2 is a flowchart diagram of an illustrative method of predicting user-item ratings according to one exemplary embodiment of the principles described herein.

Referring now to FIG. 2, a flowchart is shown of an illustrative method (200) of predicting user-item ratings in light of the principles described above. The method (200) includes the steps of providing (step 201) a first matrix of hidden variables associated with individual items and providing (step 203) a second matrix of hidden variables associated with individual users.

In the present example, the first matrix may be M, a matrix of hidden variable vectors associated with individual movies and the second matrix may be U, a matrix of hidden variable vectors associated with individual users, consistent with the principles described above. A third matrix of predicted user-item ratings derived from an inner product of hidden variable vectors in the first and second matrices may also be provided (step 205) together with a fourth matrix R of actual user-item ratings (step 207).

Initialization of the first matrix may then begin by setting (step 209) a first hidden variable corresponding to each item in the first matrix to an average rating assigned to that item in the actual user-item ratings (fourth) matrix. In the present example, the first hidden variable value in each of the hidden variable movie vectors of the first matrix M may be set to the value of an average rating given to that particular movie in the actual user-item ratings (fourth) matrix. The remaining hidden variables in the vectors of the first matrix M may be set to small, random values (step 211) as an additional step in the process of initializing the first matrix M.

The third matrix may then be solved by using an iterative Alternating-Least-Squares (ALS) approach. The values of the first matrix M may then be fixed and the second matrix U may be solved (step 213) by minimizing the sum of squared errors between defined values in the actual user-item ratings matrix R (fourth matrix) and corresponding values in the predicted user-item matrix (third matrix). Then the solved second matrix U may be fixed while the first matrix M is similarly solved (step 215) by minimizing the sum of squared errors between defined values in the actual user-item ratings matrix R (fourth matrix) and corresponding values in the predicted user-item ratings matrix (third matrix).

This ALS process of alternately fixing one of the first and second matrices and solving the other of the first and second matrices may be repeated until a stopping criterion is satisfied (decision 217). The stopping criterion may include, for example, a target root mean squared error (RMSE) between observed values in the fourth matrix R and corresponding predicted values in the third matrix. Additionally or alternatively, the stopping criterion may include a threshold change in RMSE between iterations of solving the first and second matrices. For example, in certain embodiments, after completing a round of updating both the first matrix M and the second matrix U, if the difference between the observed RMSEs on the probe dataset is less than a the predetermined threshold (e.g. 0.0001), the iteration stops and third matrix solved from the first and second matrices can then be used to make final predictions for missing values in the fourth matrix R. Still other stopping criteria may be used as may suit a particular application of the principles described herein.

Once the stopping criterion has been satisfied, the predicted user-item ratings matrix (third matrix) may be used to make accurate predictions of how individual users would rate items that they have not actually rated yet. By retrieving the predicted user-item ratings for individual users from the solved third matrix, recommendations can be made to the users.

The process of alternately solving the first and second matrices will now be described in more detail. The algorithm may be referred to as an Alternating-Least-Squares with Weighted-λ-Regularization (ALS-WR), as it incorporates Tikhonov regularization, which penalizes large parameters, thereby reducing the effect of noise in the actual user-item ratings matrix (fourth matrix). In certain embodiments, the following weighted-λ-regularization may be used:

$$f(U, M) = \sum_{(i,j) \in I} (r_{ij} - u_i^T m_j)^2 + \lambda \left( \sum_i n_{u_i} \|u_i\|^2 + \sum_j n_{m_j} \|m_j\|^2 \right), \quad (5)$$

where $n_{ui}$ and $n_{mj}$ denote the number of ratings of user i and item j respectively. Let $I_i$ denote the set of movies j that user i rated, then $n_{ui}$ is the cardinality of $I_i$; similarly $I_j$ denotes the set of users who rated movie j, and $n_{mj}$ is the cardinality of $I_j$. Equation 5 corresponds to Tikhonov regularization where $\Gamma_U = \text{diag}(n_{ui})$ and $\Gamma_M = \text{diag}(n_{mj})$.

To solve the second matrix U when the first matrix M is given, a given column of the second matrix U, for example $u_i$, may be determined by solving a regularized linear least squares problem involving the known ratings of user i and the hidden variable vectors $m_j$ of the movies that user i has rated Similarly, when M is updated, individual $m_j$s may be computed via a regularized linear least squares solution, using the feature vectors of users who rated movie j, and their ratings of it.

Once the predicted user-item ratings matrix (third matrix) has been solved, the prediction results may undergo post-processing to globally correct bias. For example, if the mean of the predicted user-item ratings matrix (third matrix) and the mean of the actual user-item ratings matrix (fourth matrix) are offset, all of the predicted values of the predicted user-item ratings matrix (third matrix) may be shifted by a fixed constant to improve the overall RMSE of the third matrix.

Illustrative System

Figure 3:
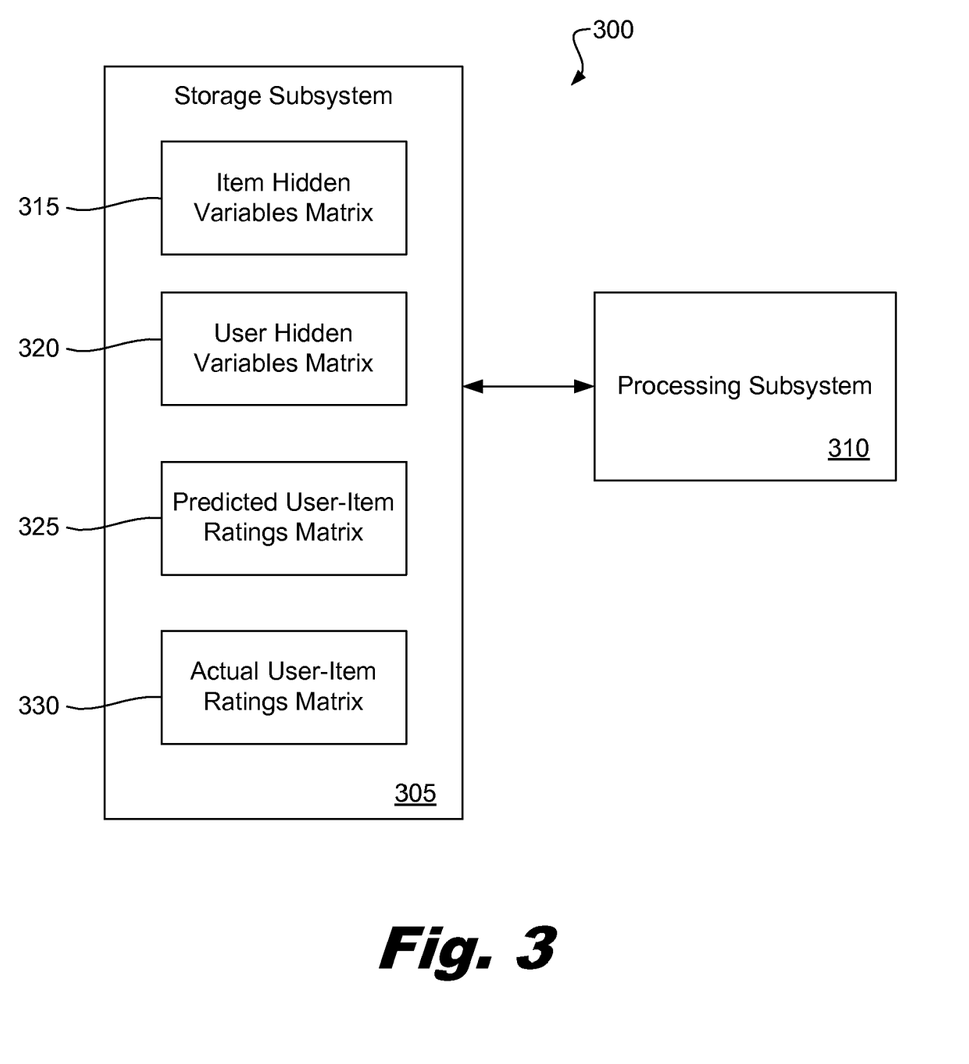
FIG. 3 is a block diagram of an illustrative system for predicting user-item ratings according to one exemplary embodiment of the principles described herein.

Referring now to FIG. 3, a block diagram of an illustrative system (300) for predicting user-item ratings is shown. The illustrative system (300) may include a storage subsystem (305) and a processing subsystem (310). The storage subsystem (305) may be configured to store several matrices (315, 320, 325, 330), including an item hidden variables matrix (315), a user hidden variables matrix (320), a predicted user-item ratings matrix (325), and an actual user-item ratings matrix (330). These matrices may be stored in any storage media that may suit a particular application, including, but not limited to, volatile memory, involatile memory, one or more hard disk drives, and combinations thereof.

The processing subsystem (310) may include at least one computer processor configured to execute instructions embodied in memory. In certain embodiments, the processing subsystem (310) may include a plurality of computer processors operating in parallel. The processing subsystem (310) may be configured to manage the operations of the storage subsystem (305) and solve the matrices (315, 320, 325) stored in the storage subsystem (305) according to the principles described above.

In certain embodiments, at least one of the processing subsystem (310) and the storage subsystem (305) may be configured to respond to queries from outside sources or processes. For example, once the matrices (315, 320, 325) have been solved and are stable, the storage subsystem (305) may be configured to respond to an external query of data from the predicted user-item ratings matrix in order for the external process to recommend one or more items to a specific user.

Furthermore, at least one of the storage subsystem (305) and the processing subsystem (310) may be configured to update values in the actual user-item ratings matrix (330) as new ratings are received from users. Once a sufficient addition or alteration of data in the actual user-item ratings matrix has occurred, the processing subsystem (310) may solve the predicted user-item ratings matrix (325) again.

EXAMPLES

The following examples illustrate a number of embodiments of the present systems and methods that are presently known. However, it is to be understood that the following are only exemplary or illustrative of the application of the principles of the present systems and methods. Numerous modifications and alternative methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be acceptable variety of possible embodiments.

The above systems and methods were applied to a large-scale data mining competition held by NETFLIX® (an online DVD rental service) for the best recommendation system algorithm for predicting user ratings on movies, based on a training set of more than 100 million ratings given by over 480,000 users to nearly 18,000 movies. Each training data point consists of a quadruple (user, movie, date, rating) where the rating is an integer from 1 to 5. The test dataset consists of 2.8 million data points with the ratings hidden. The goal of the competition is to minimize the RMSE (root mean squared error) when predicting the ratings on the test dataset and to improve NETFLIX's own recommendation system, which scores an RMSE of 0.9514 on the test dataset.

To apply the methods and systems of the present specification to the problem presented, a 30-processor Linux cluster of Hewlett-Packard® ProLiant® DL380 G4 computing devices was used, each running MATLAB® (a mathematical computing software environment), were networked together to collaborate in the processing and solving of the actual user-move ratings matrix R, the movie hidden variable matrix M, the user hidden variable matrix U, and the predicted user-move ratings matrix generated consistent with the principles described above and applied to the problem at hand. The networked computing platforms implemented distributed matrices (i.e. large matrices partitioned among several computing environments) to perform the computations. The following parallel MATLAB® code was used to implement the previously described procedure of updating M, given U:

```
function M = updateM(LAcols, U)
   lamL = lambda * eye(Nf);
   LM = zeros(Nf,NLm);
   for m = 1:NLm
      users = find(LAcols(:,m));
      Um = U(:, users);
      vector = Um * full(LAcols(users, m));
      matrix = Um * Um' + locWtM(m) * lamL;
      X = matrix \ vector;
      LM(:, m) = X;
   end
   M = gather(darray(LM));
end
```

For the above code, LAcols is the local copy of R distributed by columns (movies), locWtM is the vector of $n_{mj}$ for all movies in the partitioned movie group, and NLm is the number of movies in the movie group. The MATLAB® command "darray" creates a single distributed array object from a collection of distinct individual arrays, one in each of the computing environments making up the distributed computing environment, and the MATLAB® command "gather" converts a distributed array into one that is replicated in each of the environments. Nf and lambda correspond to $n_f$ and $\lambda$, and are the tunable parameters of the ALS-WR algorithm described in the present specification.

Other parallel and distributed implementations are possible. In the implementation above, the entirety of the user hidden variable matrix U and the entirety of the item hidden variable matrix M are gathered into each computing environment and so these environments must have storage sufficient for these matrices in their entirety either in memory or on secondary storage. In other distributed embodiments, these two matrices can be maintained in a distributed state. In an embodiment based on a modification of the MATLAB® program above, at each iteration of the loop (over variable m), only the elements needed by a particular environment to compute one column of the updated matrix (the X in the MATLAB® example above) would be gathered and stored locally.

Figure 4:
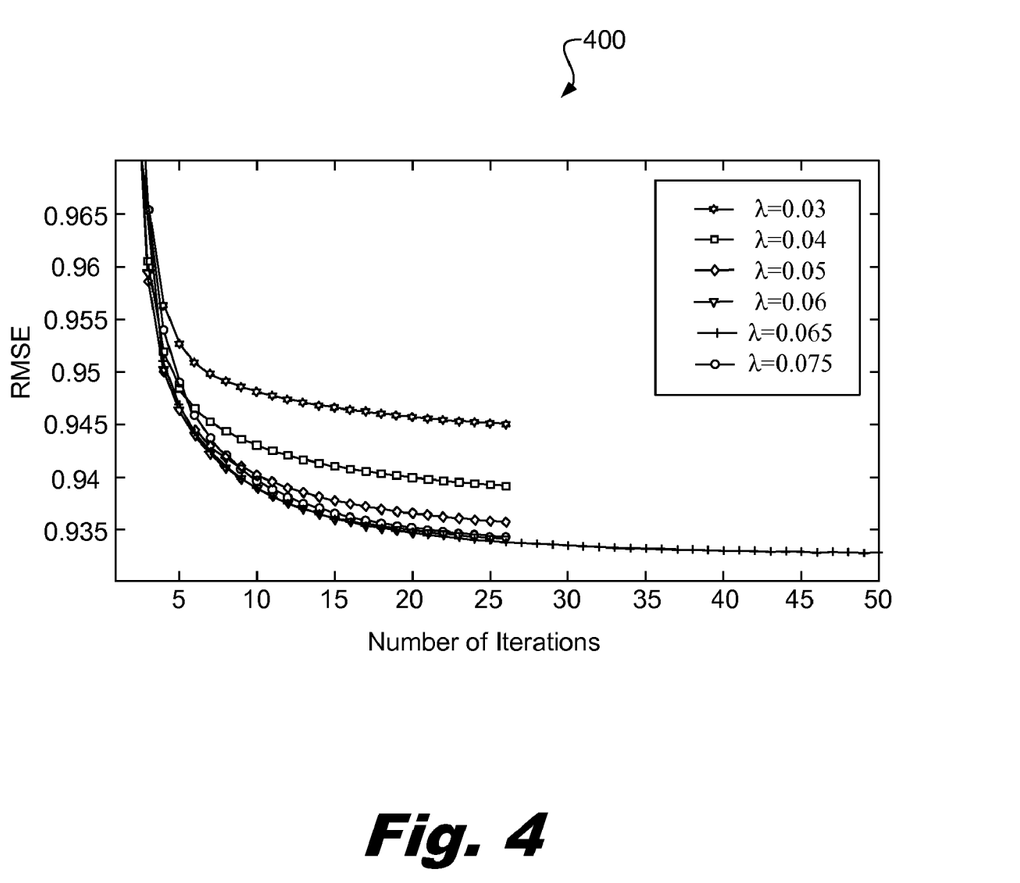
FIG. 4 is a graph of an illustrative real mean squared error (RMSE) of predicted user-item ratings plotted against a varying number of iterations of an algorithm performed of an illustrative method of predicting user-item ratings according to one exemplary embodiment of the principles described herein.

Referring now to FIG. 4, the RMSE of the predicted user-item ratings matrix is shown using fixed $n_f$ and $\lambda$ values for different numbers of iterations of the ALS-WR algorithm. As expected, each iteration improved the RMSE score of the predicted user-item ratings matrix. Different $\lambda$ values gave different final scores, and the optimal value for $\lambda$ was eventually found using trial and error.

Figure 5:
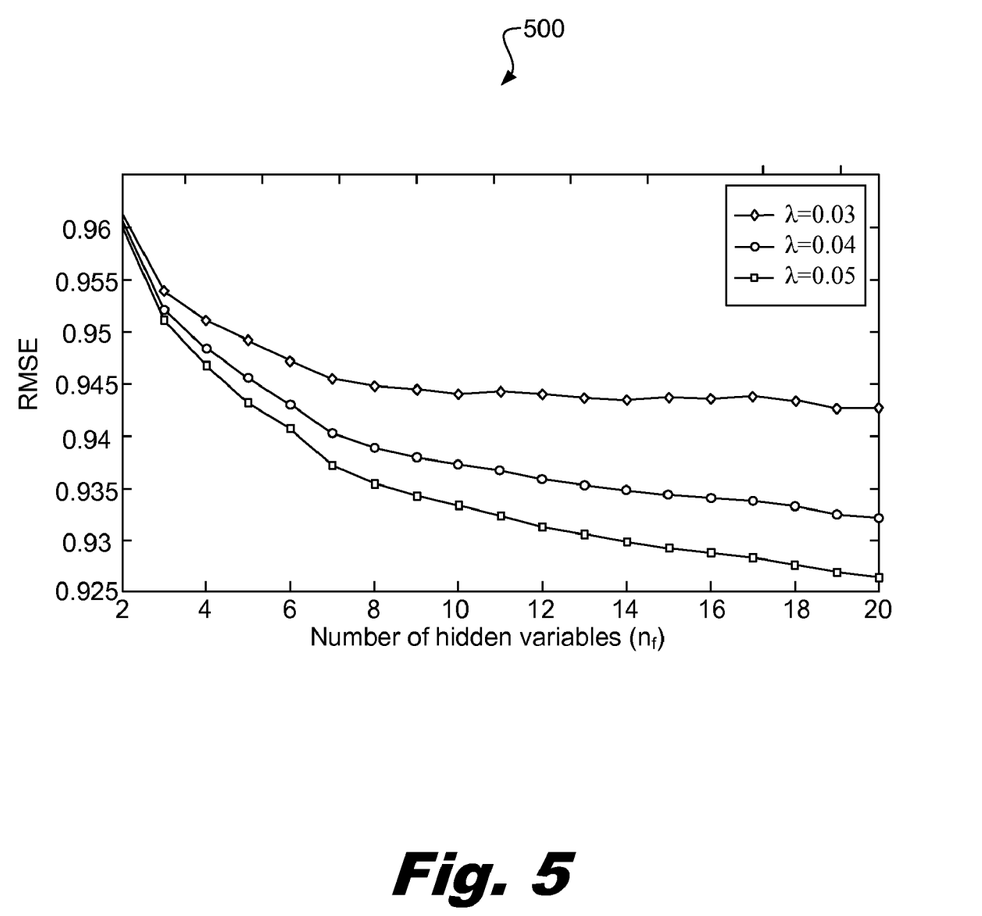
FIG. 5 is a graph of an illustrative real mean squared error (RMSE) or predicted user-item ratings plotted against a varying number of hidden variables associated with each user and item in an illustrative method of predicting user-item ratings according to one exemplary embodiment of the principles described herein.

FIG. 5 shows the performance of the ALS-WR algorithm with a fixed $\lambda$ value and a variable number of hidden variables ($n_f$). As expected, the RMSE monotonically decreased with larger $n_f$, even though the improvement diminished gradually.

Using $n_f=1000$ and post-processing analysis, an ultimate RMSE score of 0.8985 was obtained, which translated into a 5.56% improvement over the recommendation system currently used by NETFLIX®.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of predicting user-item ratings comprising:
providing with at least one processor a first matrix of hidden variables associated with individual items, a second matrix of hidden variables associated with individual users, a third matrix of predicted user-item ratings derived from an inner product of vectors in said first and second matrices, and a fourth matrix of actual user-item ratings; and
with said at least one processor, alternately fixing one of said first and second matrices and solving the other of said first and second matrices repeatedly until a stopping criterion is satisfied;
wherein said solving comprises adjusting values of said hidden variables in said matrix being solved by employing a weighted-$\lambda$ regularization of at least one of said first and said second matrices to minimize a sum of squared errors between actual user-item ratings in said fourth matrix and corresponding predicted user-item ratings in said third matrix.

2. The method of claim 1, further comprising initializing said first matrix such that a first hidden variable corresponding to each item represented in said first matrix is set to an average rating assigned to that item in said fourth matrix and remaining hidden variables in said first matrix are set to small random values.

3. The method of claim 1, wherein at least one of said first, second, third and fourth matrices is distributed among a plurality of parallel computing environments and said solving is performed by a collaboration of said parallel computing environments.

4. The method of claim 1, further comprising determining an optimal value for $\lambda$ in said weighted-$\lambda$ regularization.

5. The method of claim 1, further comprising determining an optimal number of hidden features for said vectors in said first and second matrices.

6. The method of claim 1, wherein said stopping criterion comprises a threshold change in root mean squared error (RMSE) of predicted user-item ratings in said third matrix compared to actual user-item ratings in said fourth matrix between successive solutions of said first and second matrices.

7. The method of claim 1, further comprising adjusting all ratings in said third matrix by a fixed amount such that a mean of said third matrix more closely matches a mean of said fourth matrix.

8. The method of claim 1, further comprising suggesting an item to a user based on a predicted user-item rating in said third matrix.

9. A system for predicting user-item ratings, comprising:
a storage subsystem comprising at least one memory configured to store and update a first matrix of hidden variables associated with individual items, a second matrix of hidden variables associated with individual users, a third matrix of predicted user-item ratings derived from an inner product of vectors in said first and second matrices, and a fourth matrix of actual user-item ratings; and
a processing subsystem comprising at least one processor communicatively coupled to said storage subsystem, said processing subsystem being configured to alternately fix one of said first and second matrices and solve the other of said first and second matrices repeatedly until a stopping criterion is satisfied;
wherein said solving comprises adjusting values of said hidden variables in said matrix being solved by employing a weighted-$\lambda$ regularization of at least one of said first and said second matrices to minimize the sum of squared errors between actual user-item ratings in said fourth matrix and corresponding predicted user-item ratings in said third matrix.

10. The system of claim 9, wherein said processing subsystem comprises a plurality of parallel computing environments and at least one of said first, second, third and fourth matrices is distributed among said plurality of parallel computing environments such that said solving is performed by a collaboration of said parallel computing environments.

11. The system of claim 9, wherein said stopping criterion comprises a threshold change in root mean squared error (RMSE) of between actual user-item ratings in said fourth matrix and corresponding predicted user-item ratings in said third matrix between successive solutions of said first and second matrices.

12. The system of claim 9, wherein said processing subsystem is further configured to adjust all ratings in said third matrix by a fixed amount such that a mean of said third matrix more closely matches a mean of said fourth matrix.

13. The system of claim 9, wherein said storage subsystem is further configured to provide a predicted rating from said third matrix in response to a user-item query.

14. A computer program product for predicting user-item ratings, said computer program product comprising:
   a tangible computer readable medium having computer usable program code embodied therewith, the computer usable program code comprising:
   computer usable program code configured to provide a first matrix of hidden variables associated with individual items, a second matrix of hidden variables associated with individual users, a third matrix of predicted user-item ratings derived from an inner product of vectors in said first and second matrices, and a fourth matrix of actual user-item ratings; and
   computer usable program code configured to alternately fix one of said first and second matrices and solve the other of said first and second matrices until a stopping criterion is satisfied;
   wherein said solving comprises adjusting values of said hidden variables in said matrix being solved by employing a weighted-$\lambda$ regularization of at least one of said first and said second matrices to minimize the sum of squared errors between actual user-item ratings in said fourth matrix and corresponding predicted values in said third matrix.

15. The computer program product of claim 14, wherein said computer program product is configured to be executed by a plurality of parallel computing environments such that at least one of said first, second, third and fourth matrices is distributed among said plurality of parallel computing environments and said solving is performed by a collaboration of said parallel computing environments.

16. The computer program product of claim 14, said computer usable program code further comprising computer usable program code configured to initialize said first matrix such that a first hidden variable corresponding to each item represented in said first matrix is set to an average rating assigned to that item in said fourth matrix and remaining hidden variables in said first matrix are set to small random values.

17. The computer program product of claim 14, said computer usable program code further comprising computer usable program code configured to determine an optimal value for $\lambda$ in said weighted-$\lambda$ regularization.

18. The computer program product of claim 14, wherein said stopping criterion comprises a threshold change in root mean squared error (RMSE) of predicted user-item ratings in said third matrix compared to actual user-item ratings in said fourth matrix between successive solutions of said first and second matrices.

19. The computer program product of claim 14, said computer usable program code further comprising computer usable program code configured to adjust all ratings in said third matrix by a fixed amount such that a mean of said third matrix more closely matches a mean of said fourth matrix.

20. The computer program product of claim 14, said computer usable program code further comprising computer usable program code configured to suggest an item to a user based on a predicted user-item rating in said third matrix.

* * * * *